(12) United States Patent
Bruun et al.

(10) Patent No.: US 8,894,755 B2
(45) Date of Patent: Nov. 25, 2014

(54) GAS-LIQUID SEPARATOR

(75) Inventors: Tor Bruun, Porsgrunn (NO); Torbjørn Fiveland, Skien (NO); Bjørnar Werswick, Langesund (NO)

(73) Assignee: Statoil Petroleum AS, Stavanger (NO)

( * ) Notice: Subject to any disclaimer, the term of this patent is extended or adjusted under 35 U.S.C. 154(b) by 877 days.

(21) Appl. No.: 13/120,594

(22) PCT Filed: Sep. 24, 2008

(86) PCT No.: PCT/EP2008/008087
§ 371 (c)(1),
(2), (4) Date: May 26, 2011

(87) PCT Pub. No.: WO2010/034325
PCT Pub. Date: Apr. 1, 2010

(65) Prior Publication Data
US 2012/0000643 A1  Jan. 5, 2012

(51) Int. Cl.
*B01D 19/00* (2006.01)
*E21B 43/34* (2006.01)

(52) U.S. Cl.
CPC ............ *B01D 19/0042* (2013.01); *E21B 43/34* (2013.01); *B01D 19/0063* (2013.01); *B01D 19/00* (2013.01)
USPC ................ 96/157; 95/260; 95/262; 95/243; 95/253; 96/204; 96/215; 96/163; 96/165; 96/156; 96/182

(58) Field of Classification Search
CPC ............................ B01D 19/00; B01D 19/0042
USPC .............. 95/260, 262, 243, 253; 96/204, 215, 96/163, 157, 165, 156, 182
See application file for complete search history.

(56) References Cited

U.S. PATENT DOCUMENTS

| | | | |
|---|---|---|---|
| 1,516,132 A | 11/1924 | Allen et al. | |
| 4,504,396 A * | 3/1985 | Vardi et al. | 210/800 |
| 5,507,858 A | 4/1996 | Jepson | |
| 6,267,182 B1 | 7/2001 | Lima | |
| 6,413,299 B1 | 7/2002 | Haukeness | |
| 2005/0006086 A1* | 1/2005 | Gramme | 166/105.5 |

FOREIGN PATENT DOCUMENTS

| | | |
|---|---|---|
| EP | 0 020 023 A1 | 12/1980 |
| EP | 0020023 A1 * | 12/1980 |

(Continued)

OTHER PUBLICATIONS

Mohan et at., "Design and Development of Gas-Liquid Cylindrical Cyclone Compact Separators for Three-Phase Flow" Tulsa University Separation Technology Projects, Apr. 29, 2002.

*Primary Examiner* — Duane Smith
*Assistant Examiner* — Douglas Theisen
(74) *Attorney, Agent, or Firm* — Birch, Stewart, Kolasch & Birch, LLP

(57) ABSTRACT

A gas-liquid separator includes a housing which encloses a separation chamber, an inlet port for feeding the multi-phase flow into the separation chamber, a liquid outlet port for discharging the liquid dominated flow from the separation chamber and a gas outlet port provided at a position above both the inlet port and the liquid outlet port for discharging the gas dominated flow from the separation chamber. Both the inlet port and the liquid outlet port are positioned adjacent to an elongated lower bottom wall of the housing and define a flow direction into the and out of the separation chamber approximately aligned along the bottom wall. The separation chamber extends above the bottom wall in between the inlet port and the liquid outlet port. The liquid outlet port is provided with a gas seal to prevent entrainment of free gas from the separation chamber into the liquid outlet port.

29 Claims, 5 Drawing Sheets

(56) References Cited

FOREIGN PATENT DOCUMENTS

| EP | 1 044 711 A1 | 10/2000 |
| GB | 2 197 221 A | 5/1988 |
| GB | 2 239 193 A | 6/1991 |
| RU | 2 077 364 C1 | 4/1997 |
| SU | 1248630 A1 | 8/1986 |
| WO | WO 03/080212 A1 | 10/2003 |
| WO | WO 2004/022198 A1 | 3/2004 |
| WO | WO 2004/057153 A1 | 7/2004 |
| WO | WO 2004057153 A1 * | 7/2004 |
| WO | WO 2006/098637 A1 | 9/2006 |

* cited by examiner

GAS-LIQUID SEPARATOR

The invention relates to a gas-liquid separator for separating a variable multi-phase flow of gas and liquid in a gas dominated flow and a liquid dominated flow and further relates to a production facility for a multi-phase gas-liquid well.

Production of oil and gas normally involves pipeline transport from one or several wells to a downstream handling facility, for example an offshore platform. The fluid produced by the well mostly is a mixture of gas and a liquid, e.g. oil and/or water with solid particles like sand. It is quite usual in the field of oil production to separate the gas phase from the liquid phase. Firstly, the share of gas of the fluid produced by the well lowers the oil flow capacity of the pipeline and the efficiency of production pumps. Secondly, a multi-phase flow of gas and liquid in a pipe string, for example a production conduit or a pipeline, often results in a varying flow regime which not only leads to operation problems at downstream handling facilities, but can also result in a slug regime with intermittent surges and subsequent impact of slugs on the piping and the related equipment downstream of the slugs.

The flow regime of a conduit or pipeline that carries both gas and liquid depends on several factors, the most significant of which are the gas velocity and the liquid velocity. At low gas and low liquid flow rates, the flow regime is generally stratified with the gas phase flowing at a faster rate above the liquid phase. At higher flow rates, the gas may become entrained in the liquid and waves are formed at a gas-liquid interface. If the waves go to the point where they fill the cross section of the pipeline, liquid slugs will be formed. Since the flow rate of the gas phase is typically much higher than that of the liquid phase, the liquid slugs are accelerated by the gas phase to approximately the same velocity as the gas phase. Such a liquid slug flow regime can cause unstable conditions and handling problems for downstream facilities. Downstream facilities have to be designed for such unstable flow regimes which will increase the size and costs of such equipment.

To overcome the deficiencies mentioned above, it is a general object of the invention to provide facilities for transforming a variable multi-phase flow of gas and liquid into a gas dominated flow and a liquid dominated flow in order to reduce slugs and flow variations in the liquid dominated flow.

Existing technology for separating a gas flow from a liquid flow make use of large volume cylindrical separator tanks or vessels to provide for a sufficient hold-up time of the multi-phase flow in order to maintain an efficient separation. An example of a volume based gas-liquid separator is known from GB 2 239 193 A. The separator comprises a cylindrical vessel having a length of about 5 m and a diameter of 75 cm. The gas-liquid-mixture flow enters the vessel at a multi-phase inlet port at an end face of the cylindrical vessel. The liquid is discharged at a bottom side liquid outlet port while the gas escapes through a gas outlet port on top of the vessel. The volume of the vessel is large enough to dampen incoming slugs. The gas outlet flow and the liquid outlet flow are recombined so that the separator acts as a flow regulator for regulating a multi-phase flow of fluid through a pipeline. Due to high costs, volume and large space, the volume based gas-liquid separator will not be a preferred solution for offshore or sub-sea installations.

Another gas-liquid separator capable of damping slug flow is known from U.S. Pat. No. 5,507,858. The separator comprises a tubular housing having a multi-phase flow inlet port and a gas outlet port on axially opposite sides of the housing and a liquid outlet port at the bottom of the housing. A separation table with a plurality of nozzles or through holes is positioned in an inclined position within the housing so that incoming multi-phase flow can spread over the table. While the liquid flow is decelerated on the table and is discharged through the openings of the table towards the liquid outlet port, the gas entrained in the liquid is released and is discharged through the gas outlet port. The diameter of the tubular housing is several times the diameter of the inlet port to have an efficient slug damping effect. Since incomings slugs could have a very high momentum and speed, the slugs will not pass neatly through the openings of the table, but are rather forced through the openings. Thus any free gas will be mixed with the liquid as the upper part of the housing above the table is filled by a liquid slug volume. The pressure drop at the through openings of the table will make liquid drainage less effective and will lower the separation efficiency. The table restricts the liquid height in the housing so that gas and liquid are under the same pressure which will result in a poorer gas-liquid separation.

There are prior art attempts to provide for compact gas-liquid separators. A main disadvantage of compact separators is that they have a restricted window of operating parameters and thus mostly have a poor capability of handling flow variations. A trade off has to be made with respect to tolerances of gas entrained in the liquid flow or carry over of liquid in the gas flow. Thus, with respect to phase splitting, a decision is to be made whether to have a "clean" gas phase with a minimum content of liquid or a "clean" liquid phase without entrained gas.

A compact separation system may comprise a cyclonic separator as it is known, for example, from "Design and development of gas-liquid cylindrical cyclone compact separators for three-phase flow. The cyclonic separator has a very restricted slug handling capacity since the rotational flow may cease under a slug flow regime.

Another type of compact separators is described in WO 2006/098 637 A1 which discloses a pipe separator comprising an extended tube-like body having a diameter equal to or slightly larger than the diameter of an inlet pipe or an outlet pipe of the separator. At the inlet of the tubular body, a plurality of vertical degassing pipes are connected to the inlet pipe. The upper ends of the degassing pipes are connected to a gas manifold for discharging the gas. Free gas coming in with a liquid flow will try to "escape" through the vertical pipes and will leave the separator through the manifold. The efficiency of the gas-liquid separation will depend on whether the inlet pipe section under the vertical pipes is filled with liquid or not. In a slug flow regime, separate plugs of gas and liquid will alternate. A long period of gas will cause drainage of liquid in the section of the inlet pipe below the vertical pipes and thus the next liquid plug will push the gas through the liquid outlet of the separator. Another problem with this technology is caused by T-joints between the vertical pipes and the inlet pipe. The flowing fluid passing the T-joints will be exposed to a shear force that will break up the gas phase into smaller gas bubbles which will have a much greater tendency to bypass the vertical pipes thus lowering the gas separation efficiency. If a high gas separation efficiency is to be maintained, the operation window with respect to slug flow and high flow velocity will be reduced.

Further prior art related to dampen a slug flow regime is known from U.S. Pat. No. 6,413,299 B1 while other types of gas-liquid separators are described in WO 03/080 212 A1, WO 2004/022 198 A1, EP 1 044 711 A1, GB 2 197 221 A, U.S. Pat. No. 1,516,132, RU 2 077 364 C1 and SU 1 248 630 A1.

It is an object of the invention to provide a compact gas-liquid separator for separating a variable multi-phase flow of gas and liquid in a gas dominated flow and a liquid dominated flow so that both flows are stabilized and variations are dampened.

According to the invention, the gas-liquid separator comprises: a housing enclosing a separation chamber, an inlet port for feeding a multi-phase flow into the separation chamber, a liquid outlet port for discharging a liquid dominated flow from the separation chamber, and a gas outlet port provided at a position above both the inlet port and the liquid outlet port for discharging a gas dominated flow from the separation chamber.

According to the invention, the separator is characterized in that both the inlet port and the liquid outlet port are positioned adjacent to an elongated lower bottom wall of the housing and define a flow direction into the and out of the separation chamber approximately aligned along the bottom wall, wherein the separation chamber extends above the bottom wall in between the inlet port and the liquid outlet port.

Since both the inlet port and the liquid outlet port are positioned opposite to each other and near, preferably flush, with the bottom wall, the volume of the separation chamber can be designed for an optimum of separation efficiency on the one hand and compactness of the separator on the other hand. The separation chamber extends above the bottom wall up to a desired height without any obstacles in the direct path of flow between the inlet port and the outlet port approximately aligned thereto. The tendency that shear forces will break up gas entrained in the liquid into smaller gas bubbles which may bypass, the separation volume is reduced.

The dimension of the separation chamber is designed to provide for an optimum separation efficiency at a non-slug flow regime with a minimum of gas remaining entrained in the liquid flow discharged through the liquid outlet port. Under a slug flow regime, the liquid level is allowed to rise within the separation chamber up to a maximum liquid level above the bottom wall. The separation chamber has an internal buffer volume adapted to hold up a liquid plug in the slug flow regime of the multi-phase flow. Since the horizontal cross section of the separation chamber approximately completely overlaps with the bottom wall incoming slugs will be dissipated and spread out vertically in the separation chamber and thus effectively loose their energy inside the separation chamber though liquid slugs can have a very high momentum. The internal buffer volume of the separation chamber and in particular the length and the height of the separation chamber will depend on knowledge of the liquid flow variations.

In a slug flow regime, a liquid plug is followed by a period of mainly gas flow. If the liquid-gas interface is raised due to an incoming liquid plug, not only gas pressure above the liquid-gas interface will be increased, but also the liquid pressure at the liquid outlet port thus accelerating the outflow of liquid through the liquid outlet port. Since in a slug flow regime the liquid plug is followed by a certain period in which mainly gas is flowing, there will be sufficient time to discharge the liquid plug through the liquid outlet port while lowering the level of the liquid-gas interface towards the minimum liquid level. The "gas slug" following the liquid plug also escapes through the liquid in the separation chamber towards the gas outlet port and further raises the pressure exerted onto the liquid-gas interface.

During operation, the gas-liquid interface between the liquid flowing along the bottom wall and free gas above the interface is kept on or to some extent above of a minimum lower level above an uppermost edge of a port opening of the liquid outlet port to prevent discharge of free gas through the liquid outlet port. As explained in more detail below, the position of the interface can be controlled by suitable design of the shape of the separation chamber or by level control means preferably such that the liquid provides for a gas seal that prevents the gas to be sucked into the liquid outlet port.

As easily could be understood, the liquid-gas interface must not be held on the minimum liquid level mentioned above, but may also be held on a certain upper level between the minimum liquid level and the maximum liquid level. A high operating liquid level provides for high robustness towards gas entrainment in the liquid flow at the liquid outlet port while a low operational liquid level provides for higher robustness towards liquid overflow or liquid carry over at the gas outlet port. By controlling the operational liquid level between the minimum liquid level and the maximum liquid level, a high separation efficiency with the capacity of handling large flow variations can be maintained.

The gas-liquid separator according to the invention is preferably used in the field of oil production and may be used at onshore facilities, but preferably at offshore or sub-sea facilities because of its compact dimensions. The separator can find its application in any process dealing with separation of a mixed gas and liquid flow into an gas dominated flow and a liquid dominated flow. Preferably, the liquid is a single phase of oil or a two-phase liquid of oil and water as it is produced by a well.

In a preferred embodiment, the bottom wall approximately rectilinearly slopes down in the direction of the multi-phase flow from a first vertical position defined by the inlet port to a second vertical position defined by the liquid outlet port. The angle preferably is between 2° and 18° and more preferably between 5° and 15° with respect to the horizontal direction to achieve the advantages mentioned below.

The liquid outlet port preferably has a port opening, an uppermost edge portion of which is vertically below of the lowest edge portion of a port opening of the inlet port. The slope angle of the bottom wall and the fall distance between the inlet port and the liquid outlet port define the minimum level of the gas-liquid interface within the separation chamber and provide for a gas seal which prevents that free gas is sucked out through the liquid outlet port.

Another problem encountered with conventional gas-liquid separators is that sand, which is entrained with the liquid, will be trapped in the separation chamber and is settling due to low flow velocity. Prior art separator tanks have installed a jetting system that is operated with high pressure water to remove sand from the separator. If the bottom wall slopes down in the direction of the multi-phase flow from the inlet port to the liquid outlet port sand particles will easily be carried out of the separation chamber with the liquid flow. No jetting system is necessary.

Prior art volume based gas-liquid separators have a cylindrical housing extending in the horizontal direction. This means that the horizontal width of the housing and thus the separation chamber is equal to its vertical height. The horizontal width of the separation chamber is much larger than the diameter of the inlet port. The multi-phase gas-liquid flow fed to the separation chamber will not only flow to the liquid outlet port, but will also spread out transversely. Gas bubbles entrained in the liquid thus will have the tendency to follow the liquid flow until they are stopped at walls of the housing. The time the bubbles need to reach the walls lowers the separation efficiency. In a preferred embodiment, the separation chamber has a horizontal width which is less than its horizontal length along the bottom wall and is less than its vertical height. In particular, the horizontal width of the separation chamber is approximately equal to or slightly larger than the diameter of the inlet port. The separation chamber thus has a narrow width so that any side way movement of liquid containing gas bubbles will be stopped by the wall of the housing and due to the buoyancy, the gas bubbles will be oriented in an upward movement to further increase the separation efficiency. In a preferred embodiment, the horizontal length and/or the vertical height of the separation chamber is between 10 to 20 times the horizontal width of the separation chamber. Dimensioned in this way, the gas-liquid separator is capable of eliminating slugs and of reducing flow variations to a major extent in the output flows of gas and liquid.

The gas outlet port is preferably provided adjacent a top wall of the housing in an end wall thereof opposite the inlet port and defines a flow direction of the gas dominant flow approximately in parallel with the flow direction defined by the liquid outlet port so as to better use any momentum the gas may have in this flow direction to better discharge the gas flow through the gas outlet port. Preferably, the top wall slopes upwardly towards the gas outlet port so that a free space above the gas-liquid interface widens towards the gas outlet port to improve the safety against liquid overflow into the gas outlet port.

The separation chamber has a liquid hold-up volume that will act as a buffer for smoothening out any incoming flow variation. Preferably, a separation chamber additionally contains slug damping means at the distance above the bottom wall to dampen the momentum of an incoming liquid plug in a slug flow regime. The slug damping means may be in the form of a vertically extending plate or a plurality of horizontally extending bars placed within the separation chamber downstream the inlet port. As easily can be understood, any device capable of absorbing energy from the slug can be used.

In a further preferred embodiment, wherein the housing has vertical side walls which extend opposite to each other along the bottom wall as explained above, at least one stiffening element is provided in between of and fixedly mounted to the side walls. The stiffening element strengthens the construction of the housing so that the separator can withstand very high internal and/or external pressure. A gas-liquid separator of this type is suitable for very deep sea water applications.

Preferably, a plurality of for example rod-like stiffening elements are arranged at a distance from each other, for example in an equidistant pattern. The stiffening elements can be connected to the side walls by screws or the like, but preferably are welded thereto. As easily can be understood, the stiffening elements can be used to provide for the slug damping means.

In another preferred embodiment, a gas relief pipe which upwardly extends from an upper position of a multi-phase flowing feeding pipe connected to the inlet port, is connected to a gas inlet port provided in the housing in an upper position of the separation chamber. The gas relief pipe embodiment will be most valuable in case the gas-liquid separator is fed in a stratified flow regime. Free gas above the liquid flow within the feeding pipe can enter the separation chamber directly in the upper part thereof above the gas-liquid interface. Provided with the gas relief pipe, the size and volume of the separation chamber can be reduced and the separation efficiency will be improved.

To ensure that free gas from above the gas-liquid interface within the separation chamber is not entrained into the liquid outlet port on the one hand, and to prevent liquid overflow into the gas outlet port, the gas-liquid separator preferably comprises or has assigned thereto means for controlling the level of the gas-liquid interface within the separation chamber between a minimum level above the liquid outlet port and a maximum level below the gas outlet port.

Control of the liquid level of the gas-liquid separator is important in case of great variation in liquid and gas flows, i.e. in a slug flow regime. In a period of mainly gas flow, the outlet flow of liquid from the separation chamber is preferably reduced to maintain the liquid level within the separation chamber. On the other hand, if the liquid level in the separation chamber rises above a predetermined level, the outlet flow of liquid should be increased.

As explained above, the gas-liquid separator according to the invention is to some extent self-controlling due to the fact that with raising the liquid level within the separation chamber, the weight of the liquid within the separation chamber and thus the liquid outlet flow will increase. In a preferred embodiment, an active level control is provided based on at least one flow regulating device associated with the gas outlet port and/or the liquid outlet port for controlling the level of the gas-liquid interface.

The maximum liquid level is preferably controlled by a flow regulating device at the gas outlet port. At high level interface, the flow regulating device can reduce or stop the gas flow to increase the gas pressure in the separation chamber above the gas-liquid interface so as to push more liquid out through the liquid outlet port and thus reduce the liquid level. In a simple embodiment, the flow regulating device can be in the form of a valve which is associated with the gas outlet port and is driven by a regulating float sensing the liquid level in the separation chamber. The float could directly act as a valve body closing a vertically extending portion of a gas outlet pipe or indirectly by connecting the float through a mechanical link to a separate valve within the gas outlet pipe. No power supply or instrumentation is needed for a float-actuated valve to prevent liquid overflow into the gas outlet. As easily can be understood, the float actuated valve can be provided additionally to another flow regulating device at the gas outlet port to form a "safety valve" stopping the exit of liquid through the gas outlet port independent of the liquid level control.

The float can reliably detect a predetermined liquid level within the separation chamber. The idea of the float is not confined to mechanically actuate the flow regulating device. A float can also mechanically actuating an electric signalling device adapted to control the flow regulating device. The electric signalling device can be in the form of for example a switch or a potentiometer thus forming a sensor for detecting the level of the liquid. The electric signalling device can control the flow regulating device directly through electric wiring or through electric or electronic control means.

In a preferred embodiment for providing active level control in particular with respect to the minimum liquid level, the flow regulating device is associated with the liquid outlet port. Electric or electronic control means adapted to control the flow regulating device maintain the level of the gas-liquid interface within the separation chamber between the minimum liquid level and the maximum liquid level in response to at least one sensor detecting the level or the density of the liquid. Of course, the control means may be adapted to control a plurality of flow regulating devices, each of which is associated to one port of a plurality of ports of the gas-liquid separator including the liquid outlet port and the gas outlet port.

The sensor or sensors can detect the liquid level within the separation chamber, but preferably a first one of the sensors is positioned at a multi-phase flow feeding pipe upflow of the inlet port while a second sensor is positioned at a liquid outlet pipe downflow of the liquid outlet port. The sensors may detect the liquid level within the pipes or the density of the fluid flowing through the pipes.

The flow regulating devices can be in the form of controllable regulating valves or the like. Preferably, the flow regulating device is in the form of a pump, the flow rate of which is controllable, in case the flow regulating device is associated with the liquid outlet port. The pump can be a single-phase speed-variable pump. Contrary to a regulating valve, the pump does not only allow to lower the outflow but also to raise the outflow above a gravity outflow rate of the separation chamber by sucking off liquid therefrom. As easily can be understood the pump can be in the form of a compressor, in case the flow regulating device is associated with the gas outlet port.

In the oil production field, it is common to clean a pipe by means of a pig propelled through the pipe by the multi-phase flow. To allow the pig to pass through the separation chamber, the chamber provides for a free flow path at a certain distance above the bottom wall. Preferably, the bottom wall has an approximately semi-circular cross-section, the radius of which is equal to the radius of a circular cross-section of the inlet port and/or the liquid outlet port. To guide the pig next to the bottom wall while it is moving, the bottom wall comprises at least one elongated guide rail which extends along the bottom wall. The guide rail can be in the form of a grating covering the bottom wall at a distance equal to the diameter of the inlet port. Alternatively, a pipe having an elongated slot can be provided between the inlet port and the liquid outlet port. The pipe forms the bottom wall with the slot facing upwards with the edges of the slot forming the guide rails.

To further improve the separation efficiency in another preferred embodiment, a plurality of gas-liquid separators can be connected in series to form a multi-stage gas-liquid separator with the inlet port of a downflow gas-liquid separator being connected to the gas outlet port or the liquid outlet port of an upflow gas-liquid separator. Connecting the separators into a multi-stage separator will improve the separating efficiency as well as the slug damping capacity. Even if the upflow separator shows some liquid overflow at the gas outlet port or some gas overflow at the liquid outlet port, the downflow separator will provide for an optimum of phase separation and flow stabilization.

In the production of oil and gas, the liquid produced by a well often is in the form of a multi-phase liquid comprising oil and water. Prior art three-phase separators capable of separating a three-phase mixture into a gas flow, an oil flow and a water flow need to have a large volume to provide for a sufficient hold-up time necessary to maintain an efficient separation, or the separator must be run under very restricted flow operation conditions with a limited capability of handling a slug flow regime. Under a second aspect, the invention provides a simple and compact multi-phase gas-liquid separator facility capable of separating a three-phase flow of gas and two liquids having different densities. The separator facility comprises a multi-phase liquid separator for separating liquids having different densities and a gas-liquid separator as explained above which forms a front-up device with respect to the multi-phase liquid separator. The gas-liquid separator in a first stage of the separator facility separates the gas phase and discharges the multi-phase flow of liquids to the multi-phase liquid separator which in turn separates the multi-phase flow of liquids in at least a first liquid dominated flow, in particular an oil dominated flow and a second liquid dominated flow, in particular a water dominated flow. The separator facility is compact enough to be used in a sub-sea installation and thus allows injection of one of the three phases, for example the gas phase or the water phase to a reservoir of a well for pressurizing the reservoir. The remaining phases can be transported through a production conduit or a pipeline to any downstream processing equipment. Taking out the gas will reduce the size of the oil-water separator and thus makes a sub-sea oil-water separator a possible technical and economic option. To separate the water from the oil close to the well at the seabed could be most important since many oil and gas wells have an increase in water production with age and thus the second aspect of the invention has a major influence on the economy of oil and gas production in particular with respect to a sub-sea oil-water separator.

The gas-liquid separator according to the invention provides for an equalized gas dominated flow and an equalized liquid dominated flow independent of the gas dominated flow. This is of particular importance with respect to low-pressure production of a well. Low-pressure production has a need for boosting the pressure to transport the liquid and/or the gas to a downstream transport pipeline a treating facility. By having separated the gas phase and the liquid phase, conventional single-phase pumps and gas compressors can be used instead of more complicated and expensive multi-phase pumps. Even multi-phase pumps can make use of the invention. The gas-liquid separator according to the invention forming an up-front device of a multi-phase pump stabilizes the flow and allows mixing the gas and liquid in a controlled way upflow of the multi-phase pump. Irregular flow with periods of single-gas phases which can harm the multi-phase pump are avoided.

The invention will now be described, by way of example, with reference to the accompanying drawings in which FIG. 1 is a diagrammatic longitudinal section of an embodiment of a gas-liquid separator according to the invention;

Figures 1, 2:
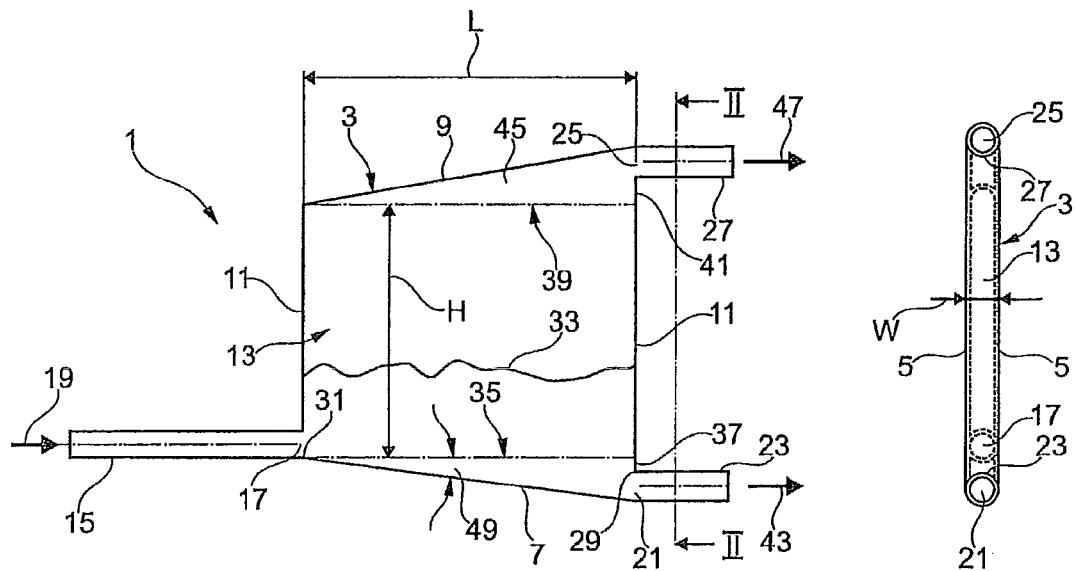
FIG. 2 is a cross-section of the gas-liquid separator along line II-II in FIG. 1

FIGS. 1 and 2 show a compact gas-liquid separator 1 having a flat housing 3 comprising flat side walls 5, a semi-circular bottom wall 7, a semi-circular top wall 9 and end walls 11. The walls 5, 7, 9 and 11 enclose a separation chamber 13. Adjacent the bottom wall 7, a feeding pipe 15 is connected to an inlet port 17 at the upstream one of the end walls 11 for feeding a multi-phase gas-liquid flow into the separation chamber 13. The direction of feeding flow is indicated by an arrow 19.

Opposite to the inlet port 17 with respect to the separation chamber 13, there is provided in the downstream one of the end walls 11 adjacent the bottom wall 7 a liquid outlet port 21 connected to a liquid outlet pipe 23 and above the liquid outlet port 21 and adjacent to the top wall 9, a gas outlet port 25 connected to a gas outlet pipe 27 is provided.

In an operation position, the side walls 5 are arranged vertically upright with the liquid outlet port 21 with its uppermost edge 29 being positioned below a lowermost edge 31 of the inlet port 17. A multi-phase inflow of gas and liquid through the feed pipe 15 into the separation chamber 13 will lead to a gas-liquid interface 33 in the separation chamber 13. The level of the interface 33 will depend on the difference between the liquid pressure at the liquid outlet port 21 and the gas pressure at the gas outlet port 25. The liquid below the interface 33 will be discharged through the liquid outlet port 21 while the gas above the interface 33 will escape through the gas outlet port 25. Gas entering the separation chamber 13 through the inlet port 17 will move upwards due to the buoyancy.

The separator 1 is adapted to transform a variable two-phase flow of gas and liquid into two stabilized, e.g. smoothened flows of a liquid dominated flow and a gas dominated flow in particular with a minimum of gas entrained in the liquid dominated flow and a minimum of liquid overcarry in the gas dominated flow. The separator 1 is further adapted to stabilize a slug flow regime as will become apparent from the description below.

The separation chamber 13 provides for a buffer volume for the liquid between a minimum liquid level 35 which is located a predetermined fall distance 37 above the uppermost edge 29 of the liquid outlet port 21 and a maximum liquid level 39 which is located a distance 41 below the gas outlet port 25. The buffer volume is defined by a width W horizontally between the side walls 5, a height H between the minimum liquid level 35 and the maximum liquid level 39 and a length L horizontally between the end walls 11. The buffer volume is dimensioned to handle a liquid plug coming in in a slug flow regime.

For reasons explained below, the width W of the separation chamber 13 is equal to or slightly larger than the internal diameter of the inlet port 17 and thus the feed pipe 15. The height H and the length L are dimensioned to be about 10 to 20 times the width W. Thus the liquid height can rise 10 to 20 times the feed pipe diameter before reaching the maximum liquid level 39. This means that the separation chamber 13 will typically have a liquid hold time of more than 10 to 20 times a feed pipe section with the length equal to the length L of the separation chamber 13. Under regular conditions, this will be sufficient to handle a liquid plug in a slug flow regime.

Further, the flow rate of liquid through the liquid outlet port 21 is dependent on the level of the interface 33. An increase in liquid height due to increased incoming liquid flow will result in an increase outlet liquid flow. Thus, the separator 1 will handle liquid flow variations more flexibly than prior art separation equipment operating with a relatively constant liquid hold-up volume.

The level of the interface 33 is controlled to always remain above the minimum liquid level 35 and below the maximum liquid level 39 for example by controlling the output flow (arrow 43) through the liquid outlet port 21. Since the minimum liquid level 35 is maintained above the liquid outlet port 21, the liquid below the minimum liquid level 35 provides for a syphon-type gas seal which prevents free gas from above the interface 33 to be sucked out through the liquid outlet port 21. Gas entrained in the liquid dominated flow 43 can thus be held on a minimum.

The level of the interface 33 is further controlled not to rise above the maximum liquid level 39. Since the gas outlet port 25 is a distance 41 above the maximum liquid level 39 and the top wall 9 slopes upwardly towards the gas outlet port 25 between the end walls 11, under every operating condition there is a free space 45 above the interface 33 which allows the discharge of the gas through the gas outlet port 25 in the form of a stabilized gas dominated flow 47.

The diameters of the liquid outlet port 21 and the gas outlet port 25 are approximately equal to the diameter of the inlet port 17. In a slug flow regime, a liquid plug will normally be followed by a gas "slug". Since the gas outlet port 25 and the inlet port 17 have the same diameter, all the gas introduced into the separation chamber 13 can immediately escape through the gas outlet port 25.

The downward slope angle 49 of the bottom wall 7 with respect to the horizontal direction is about 5° to 15°. At length L between 10 and 20 times the diameter of the inlet port 17, this will provide a downfall height 37 sufficient to prevent entrainment of free gas through the liquid outlet port 21.

The slope construction of the bottom wall 7 does not only provide for the gas seal at the outlet port 21, but ensures that sand eventually carried with the liquid inflow will not be trapped within the separation chamber 13, but will exit through the outlet port 21 even at low liquid velocity. Any high-pressure water jetting system will be unnecessary. The lowermost edge portion of the port opening of the liquid outlet port 21 is positioned at or slightly below the bottom wall.

In the following modifications, improvements and examples of application of the gas-liquid separator as described above will be explained. Components having the same function and/or design will have assigned the same reference numeral with a letter added for distinction. Reference is made to the complete description above and variations described with reference to a certain embodiment will also apply to all the other embodiments.

Figure 3:
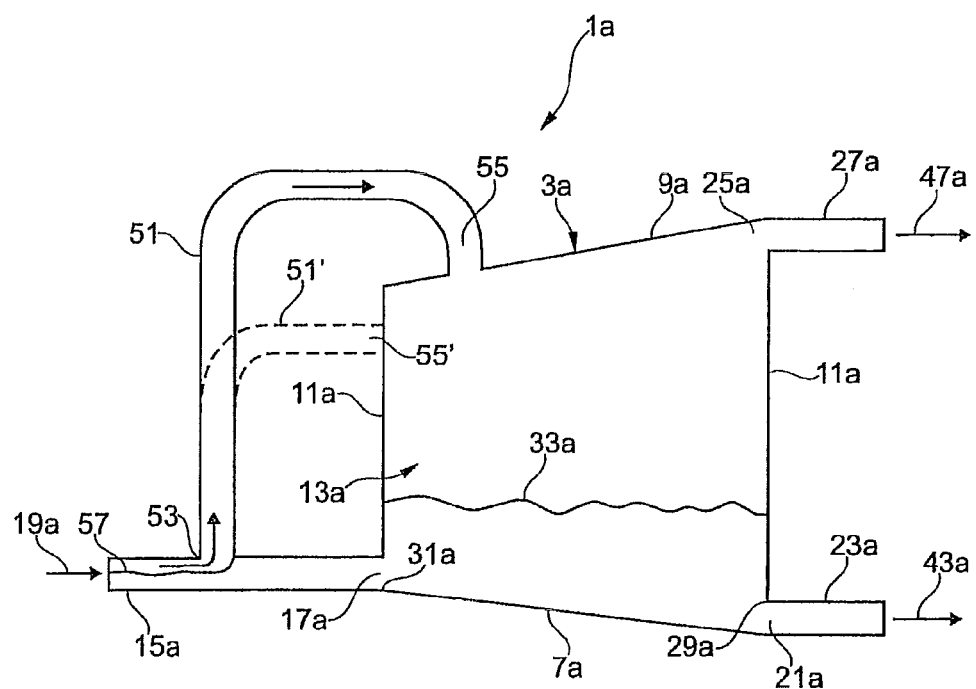
FIG. 3 is a diagrammatic longitudinal section of a second embodiment of the gas-liquid separator with a gas relief pipe upstream of the separator.

The gas-liquid separator 1a shown in FIG. 3 differs from the gas-liquid separator shown in FIGS. 1 and 2 by a gas relief pipe 51 which upwardly extends from a T-joint 53 at an upper position of the feeding pipe 15a and leads to an upper portion of the separation chamber 13a. In the embodiment of FIG. 3, the gas relief pipe 51 is connected to a port 55 at or near the top wall 9a. Shown in dashed line at 51', a variant of the gas relief pipe is shown with a port 55' at an upper end of the upstream end wall 11a. Of course a plurality of gas relief pipes may be provided with T-joints staggered in axial direction of the feeding pipe 15a.

Providing the gas relief pipe 51 is most valuable in case the multi-phase inflow 19a is in the form of a stratified flow with a gas-liquid interface 57 within the feeding pipe 15a. The gas flowing above the interface 57 can directly enter the separation chamber 13a through the gas relief pipe 51 and therefore size and volume of the separation 13a can be reduced thus making the separation more efficient.

Figure 4:
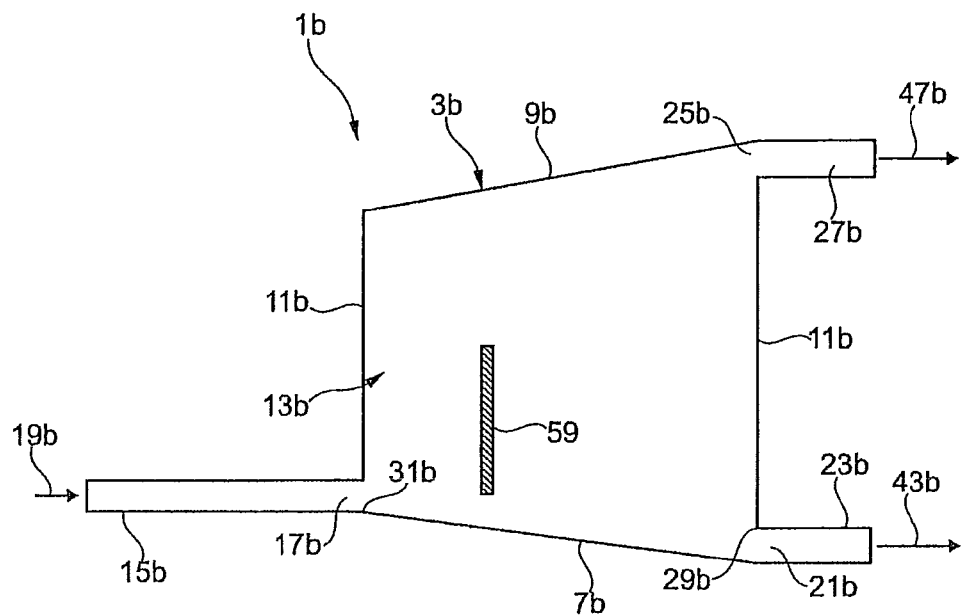
FIG. 4 is a diagrammatic longitudinal section of a third embodiment of the gas-liquid separator comprising a slug damping device within its separation chamber.

FIG. 4 shows a gas-liquid separator 1b having arranged a damping device 59 within the separation chamber 13b downstream of the inlet port 17b. The damping device 59 is in the form of a vertical plate extending between the side walls of the housing 3b. The lower end of the plate 59 is positioned above the bottom wall 7b at a distance somewhat wider than the diameter of the feeding pipe 15b. Thus the other end of the plate 59 ends at a distance from the top wall 9b to provide for a free gas flow at the top wall 9b. The damping device 59 dampens the momentum of an incoming slug inside the separation chamber 13b and absorbs the forced momentum of the liquid slug. A gas relief pipe may be provided additionally as explained with reference to FIG. 3.

Figures 5, 6:
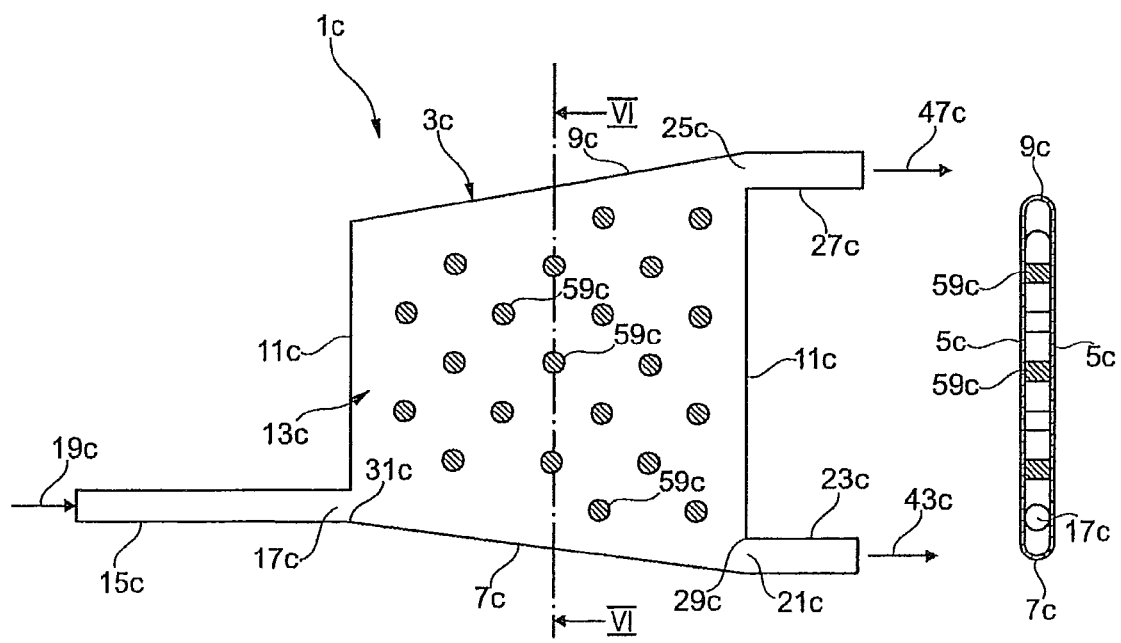
FIG. 5 is a diagrammatic longitudinal section of a fourth embodiment of the gas-liquid separator as an alternative to FIG. 4.
FIG. 6 is a cross-section through the gas-liquid separator along a line VI-VI in FIG. 5.

The gas-liquid separator shown in FIGS. 5 and 6 differs from the separator of FIG. 4 by its slug damping device 59c which is in the form of rods which horizontally extend between the side walls 5c and are arranged in an equidistant pattern. Again, the lowermost rods 59c are provided above the bottom wall 7c at a distance larger than the diameter of the feeding pipe 15c.

The damping device 59 of FIG. 4 and the rods forming the damping device 59c of FIGS. 5 and 6 do not only provide for the damping of slugs, but also stiffen the housing 3b, 3c. The plate and the rods are welded at both ends to the vertical side walls, as for example the side walls 5c in FIG. 6. The gas-liquid separator thus can withstand very high pressures, both internal and external pressures, and thus is suited for very deep sea water applications.

Figure 7:
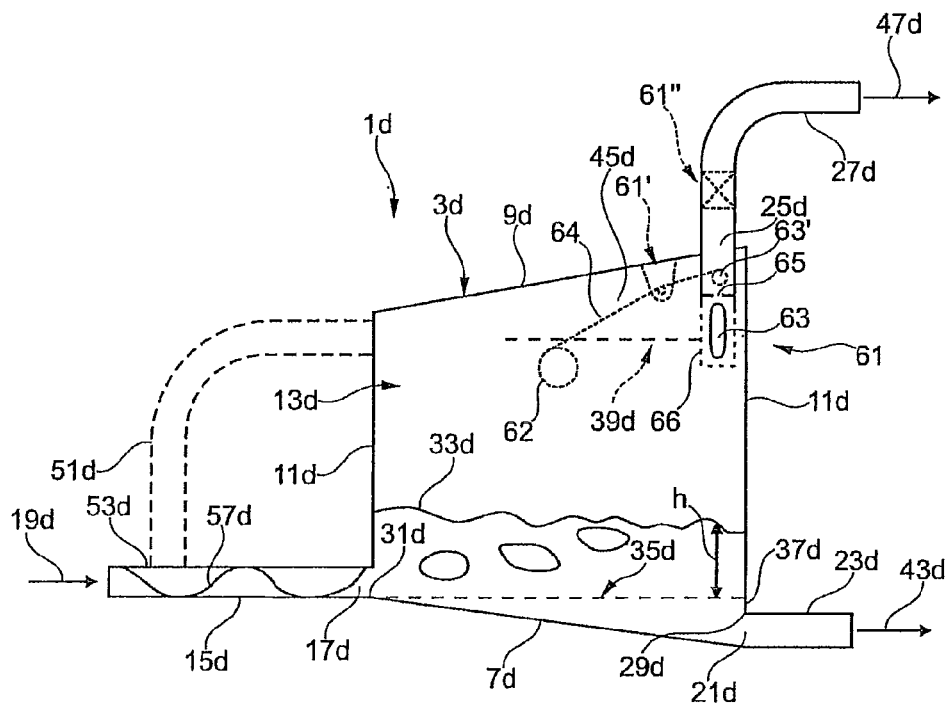
FIG. 7 shows a fifth variant as an alternative of the embodiments shown in FIGS. 1 and 2.

For an optimum operation it is essential that the level of the gas-liquid interface within the separation chamber is maintained between the minimum liquid level and the maximum liquid level as it was explained with respect to FIG. 1. FIG. 7 shows an embodiment having a gas outlet valve 61 at the gas outlet port 25d. The valve 61 has a valve body 63 in the form of a for example spherical or approximately cylindrical float which is vertically moveably guided in a perforated guiding sleeve 66 below a ring-like valve seat 65 and closes the valve 61 if the level of the gas-liquid interface 33d reaches the maximum liquid level 39d. In the gas outlet port 25d the gas pressure within the free space 45d above the maximum liquid level 39d will increase to increase the liquid outflow rate at the liquid outlet port 21d. A liquid carryover at the gas outlet port 25d will be prevented. Entrainment of free gas at the liquid outlet port 21d is prevented due to the gas seal at the liquid outlet port 21d as explained above. Indicated by dash point lines, FIG. 7 also shows a valve 61' as an alternative to the valve 61. The valve 61' is actuated by means of a separate float 62 which is mechanically linked to a valve body 63' associated with the valve seat 65. The mechanical link is in the form of a double-lever 64 which is pivotally mounted to the housing 3d of the separation chamber 13d. The arrangement is such that the float 62 closes the valve 61' if the level of the gas-liquid interface reaches the maximum liquid level 39d.

As indicated in dashed lines at 61", a float actuated valve, preferably in an embodiment in which the float directly forms the valve body as it is the case with the valve 61, is provided in a vertical portion of the gas outlet pipe 27d above the separation chamber 13d to form a "safety valve" which closes to stop inflow of liquid into the gas outlet pipe 27d. The valve 61" can be provided additionally to other flow regulating devices at the gas outlet port, in particular flow regulating devices which only partially close the gas flow through the gas outlet port for controlling the liquid level within the separation chamber. As easily can be understood, such an additional safety valve is not confined to the type and position of the valve, in particular a float actuated valve.

Figure 8:
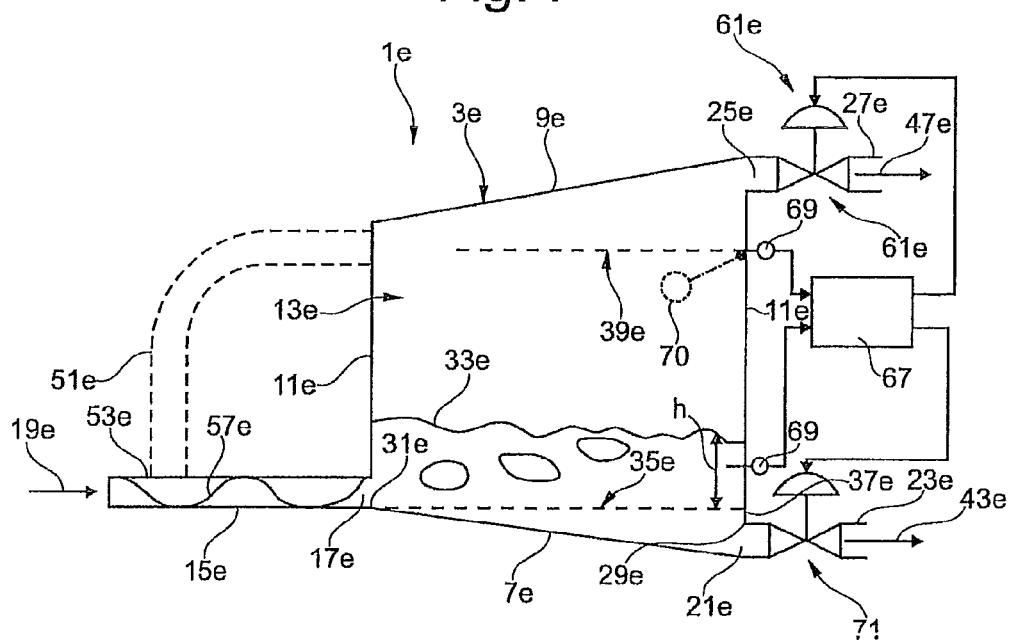
FIG. 8 is a variant of the embodiment of FIG. 7.

FIG. 8 shows a gas-liquid separator 1e which differs from the separator shown in FIG. 7 in that the gas outlet valve provided at the gas outlet port 25e is an actuator driven valve which is controlled by an electronic controller 67. The controller 67 is connected to level sensors 69 which detect the liquid level at different heights. The controller 67 will close the gas outlet valve 61e if the liquid level reaches the maximum liquid level 39e. Additionally, also the liquid outlet port 21e is provided with an actuator driven liquid outlet valve 71 to close the liquid outlet port 21e in case the liquid level h tends to fall under the minimum liquid level 35e. As can be understood, the valves 61e and 71 may also be partially opened and closed. The sensors 69 can be of any form suitable to detect the existence of liquid at the position of the sensor by measuring the resistance between two electrodes or by measuring the inductivity or capacity of the fluid at the sensor position. The sensor may also be in the form of an optical or electromagnetic wave distance measuring device. In a mechanically reliable embodiment, the sensor 69 is in the form of an electric signalling device, for example a switch or a potentiometer which is mechanically actuated by means of a float 70 as indicated in FIG. 8 by dash point lines. Of course, each of the sensors 69 associated to the controller 67 may be actuated by a float as described above.

Figures 9, 10:
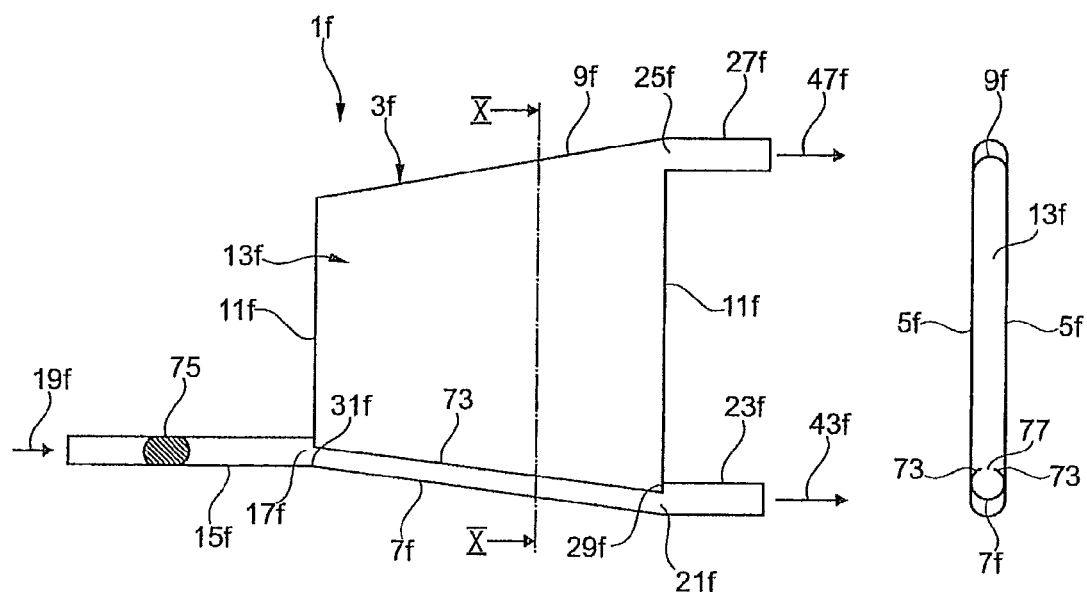
FIG. 9 shows a variant of the gas-liquid separator allowing a pigging operation.
FIG. 10 is a cross-section of the gas-liquid separator shown along a line X-X in FIG. 9.

As common with the production of oil, pipelines and the like need to be cleaned. Usually a "pig", e.g. a cleaning body having a diameter slightly less than the inner diameter of the pipe to be cleaned is used. The pig is propelled through the pipe by moving with the flow of liquid and gas. In a preferred embodiment shown in FIGS. 9 and 10, the gas-liquid separator 1f is provided near its bottom wall 7f with guide rails 73 for guiding a cleaning pig 75 which enters the separation chamber 13 through the feeding pipe 15f and the inlet port 17f and travels along the bottom wall 7f through the separation chamber 13f along the entire length thereof. The cleaning pig 75 exits the separation chamber through the liquid outlet port 21f and the liquid outlet pipe 23f. To provide the guide rails 73, a pipe having a diameter of the feeding pipe 15f can be provided with a longitudinally extending slot 77 the edges of which form the guide rails 73.

Figure 11:
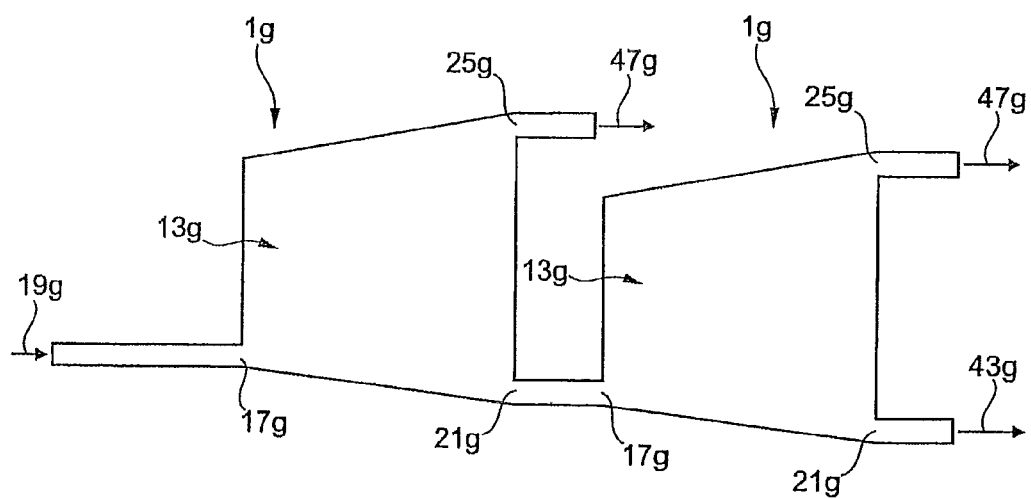
FIG. 11 is a diagrammatic longitudinal section of a multi-stage separator.

To further improve the separation efficiency and the capacity to handle a slug flow regime, a plurality of gas-liquid separators 1g are connected in series to form a multi-stage separator as shown in FIG. 11. By providing a series of gas-liquid separators 1g, the separation efficiency as well as the capacity to handle a slug flow regime can be improved. In the embodiment shown in FIG. 11, the inlet port 17g of the downstream gas-liquid separator is connected in series to the liquid outlet port 21g of the upstream gas-liquid separator 1g. Also more than two separators may be connected in series. Not shown is an embodiment in which additionally or alternatively a downstream gas-liquid separator is provided the inlet port of which can be connected in series to the gas-outlet port 25g of the upstream gas-liquid separator.

Figure 12:
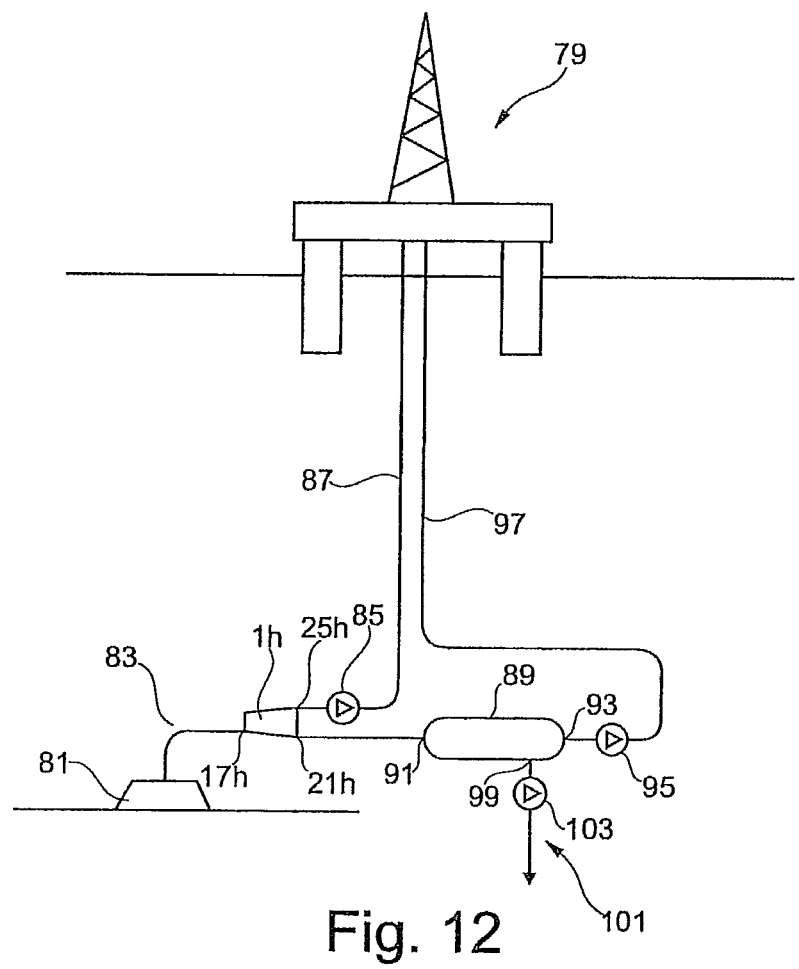
FIG. 12 is in diagrammatic form a sub-sea installation of a three-phase separator and FIG. 13 is a preferred variant of the gas-liquid separator of FIG. 8.

The gas-liquid separator as explained above is preferably used in an offshore and a sub-sea application. FIG. 12 shows an offshore platform 79 with an oil production sub-sea well 81 associated therewith. The well produces a three-phase mixture of oil, water and gas which is fed through a pipe 83 to the inlet port 17h of a gas-liquid separator 1h as explained above. The gas from gas outlet port 25h is fed via a production pump or gas compressor 85 and a gas conduit 87 to the platform for further handling.

The gas-liquid separator 1h separates the gas from a two-phase liquid of oil and water which is discharged at the liquid outlet port 21h of the gas-liquid separator 1h. A for example volume-based oil-water separator 89 is connected with its inlet port 91 to the liquid outlet port 21h of the separator 1h and discharges at an oil outlet 93 oil which is transported via a production pump 95 and another production conduit 97 also to the platform for further handling. The water discharged at a water outlet 99 of the oil-water separator 89 is re-injected by injection facilities 101 which include a pump 103 to the reservoir of the well 81. The gas-liquid separator 1h and the oil-water separator 89 are provided at the seabed. The pumps 85, 95 and 103 are single-phase fluid pumps since gas, oil and water are produced at separate outlets.

Figure 13:
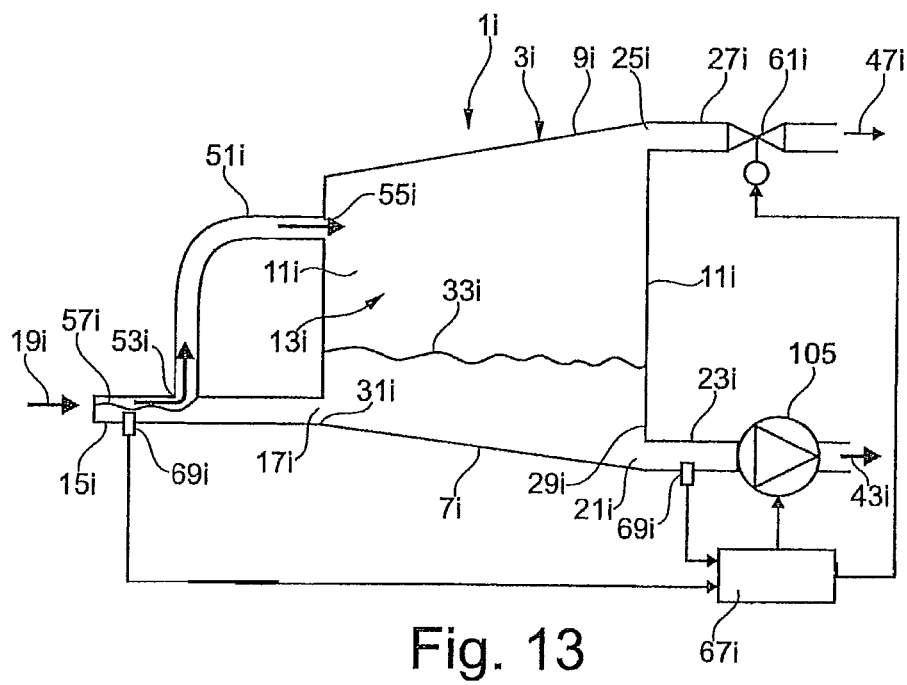

FIG. 13 shows an embodiment of a gas-liquid separator 1*i* providing for an active level control in a variant of the embodiment of FIG. 8. Instead of an actuator driven valve at the liquid outlet pipe 23*i*, a speed variable pump 105 is used to control the flow of the liquid outlet port 21*i*. The pump 105, which can be in the form a single-phase pump, is frequency-controlled through the controller 67*i* which is responsive to a first liquid level and/or density sensor 69*i* upflow of the inlet port 17*i* and the T-junction 53*i* of the gas relief pipe 51*i*, and a second liquid level and/or density sensor 69*i* downflow the liquid outlet port 21*i* but upflow of the pump 105. Positioning the sensors 69*i* as explained above provides for a quick but oscillation-free level control.

Similar to the embodiment of FIG. 8, also the gas outlet pipe 27*i* is provided with an actuator driven valve 61*i* for reducing the outlet gas flow to push the liquid outlet flow and to control the maximum height of the liquid level within the separation chamber 13*i*.

Using a pump instead of an actuator driven valve allows to increase the outflow rate through the outlet pipe above the outflow determined by gravity or internal liquid pressure. Of course, the valves 71 or 61*e* shown in FIG. 8 and the valve 61*i* may also be replaced by a pump or a gas compressor, respectively.

The invention claimed is:

1. A gas-liquid separator for separating a variable multi-phase flow of gas and liquid into a gas dominated flow and a liquid dominated flow, the variable multi-phase flow of gas and liquid comprising oil from a well, the separator comprising:
   a housing enclosing a separation chamber;
   an inlet port for feeding the multi-phase flow into the separation chamber;
   a liquid outlet port for discharging the liquid dominated flow from the separation chamber; and
   a gas outlet port provided at a position above both the inlet port and the liquid outlet port for discharging the gas dominated flow from the separation chamber,
   wherein both the inlet port and the liquid outlet port are positioned adjacent to an elongated lower bottom wall of the housing and define a flow direction into and out of the separation chamber approximately aligned along the bottom wall, and wherein the separation chamber extends above the bottom wall in between the inlet port and the liquid outlet port, and
   wherein the inlet port is configured to be connected to a pipe which receives the variable multi-phase flow of gas and liquid from the well.

2. The gas-liquid separator according to claim 1, wherein the separation chamber has an internal buffer volume adapted to hold up a liquid plug in a slug flow regime of the multi-phase flow.

3. The gas-liquid separator according to claim 1, wherein the bottom wall at least approximately rectilinearly slopes down in the direction of the multi-phase flow from a first vertical position defined by the inlet port to a second vertical position defined by the liquid outlet port at an angle between 2° and 18° with respect to the horizontal direction.

4. The gas-liquid separator according to claim 3, wherein the liquid outlet port has a port opening, an uppermost edge portion of which is vertically below a lowest edge portion of a port opening of the inlet port.

5. The gas-liquid separator according to claim 3, wherein the liquid outlet port has a port opening, a lowest edge portion of which is positioned vertically at or below the bottom wall.

6. The gas-liquid separator according to claim 1, wherein the separating chamber has a horizontal width (W) which is less than its horizontal length (L) along the bottom wall and is less than a vertical height (H) thereof.

7. The gas-liquid separator according to claim 6, wherein the horizontal width (W) of the separation chamber is approximately equal to or slightly larger than the diameter of the inlet port.

8. The gas-liquid separator according to claim 6, wherein the horizontal length (L) or the vertical height (H) of the separation chamber is between ten to twenty times the horizontal width (W) of the separation chamber.

9. The gas-liquid separator according to claim 1, wherein the gas outlet port is provided adjacent to a top wall of the housing in an end wall of the housing opposite the inlet port and defines a flow direction of the gas dominant flow approximately in parallel with the flow direction defined by the liquid outlet port.

10. The gas-liquid separator according to claim 1, wherein a top wall slopes upwardly towards the gas outlet port.

11. The gas-liquid separator according to claim 1, wherein the separation chamber contains a slug damping mechanism at a distance above the bottom wall.

12. The gas-liquid separator according to claim 1, wherein the housing has vertical side walls which extend opposite to each other along the bottom wall, and wherein at least one stiffening element is provided each in between of and fixedly mounted to the side walls.

13. The gas-liquid separator according to claim 1, wherein a gas relief pipe which extends upwardly from an upper position of a multi-phase flow feeding pipe connected to the inlet port is connected to a gas inlet port provided at the housing in an upper position of the separation chamber.

14. The gas-liquid separator according to claim 1, wherein the gas-liquid separator comprises or has assigned thereto a mechanism configured to control the level of a gas-liquid interface within the separation chamber between a minimum level above the liquid outlet port and a maximum level below the gas outlet port.

15. The gas-liquid separator according to claim 14, wherein a flow regulating device is associated with the gas outlet port or with the liquid outlet port for controlling the level of a gas-liquid interface within the separation chamber.

16. The gas-liquid separator according to claim 15, wherein the flow regulating device is associated with the liquid outlet port or a plurality of flow regulating devices are associated each to one port of a plurality of ports of the gas-liquid separator including the liquid outlet port; the gas-liquid separator further comprising a control device configured to control the flow regulating device or devices so as to maintain the level of a gas-liquid interface within the separation chamber between a minimum liquid level and a maximum liquid level in response to at least one sensor detecting the level or the density of liquid.

17. The gas-liquid separator according to claim 16, wherein the control device is responsive to a plurality of sensors, a first sensor of which is positioned at a multi-phase flow feeding pipe upflow of the inlet port and a second sensor of which is positioned at a liquid outlet pipe downflow of the liquid outlet port.

18. The gas-liquid separator according to claim 16, wherein the flow regulating device at the gas outlet port is a controllable regulating valve or a compressor, the flow rate of which is controllable or the flow regulating device at the liquid outlet port is a controllable regulating valve or a pump, the flow rate of which is controllable.

19. The gas-liquid separator according to claim 15, comprising a float responsive to the liquid level within the separation chamber, wherein the float is adapted to mechanically actuate a flow regulating device at one of the ports of the gas-liquid separator in particular the gas outlet port or to mechanically actuate an electric signalling device adapted to control the flow regulating device.

20. The gas-liquid separator according to claim 19, wherein the flow regulating device associated to the gas outlet port is a valve comprising a valve seat and a valve body forming the float, the valve body being arranged below the valve seat vertically moveably guided by guide device so as to close the valve seat if the liquid level reaches a predetermined level.

21. The gas-liquid separator according to claim 1, wherein the bottom wall has an approximately semicircular cross-section, the radius of which is equal to the radius of a circular cross-section of the inlet port or the liquid outlet port.

22. The gas-liquid separator according to claim 21, wherein the bottom wall comprises at least one elongated guide rail which extends along the bottom wall to guide a pig moving along the bottom wall.

23. The gas-liquid separator according to claim 1, wherein a plurality of gas-liquid separators are connected in series to form a multi-stage gas-liquid separator with the inlet port of an upflow gas-liquid separator connected to the gas outlet port or the liquid outlet port of a downflow gas-liquid separator.

24. A multi-phase gas-liquid separator facility comprising:
a multi-phase liquid separator for separating a multi-phase flow of liquids having different density in at least a first liquid dominated flow and a second liquid dominated flow, and a gas-liquid separator according to claim 1 forming a front-up device with respect to the multi-phase liquid separator for discharging the multi-phase flow of liquids thereto.

25. The multi-phase gas-liquid separator facility according to claim 24, wherein an injection facility for pressurizing a reservoir of a well is connected to the gas outlet port of the gas-liquid separator or a water outlet port of the multi-phase liquid separator.

26. A production facility for a multi-phase gas-liquid well comprising a gas-liquid separator according to claim 1 and at least one single phase pump connected to the gas outlet port or the liquid outlet port of the gas-liquid separator.

27. A production facility for a multi-phase gas-liquid well comprising at least one gas-liquid separator according to claim 1, wherein the gas-liquid separator is provided in an offshore topside position or a sub-sea position.

28. A gas-liquid separator for separating a variable multi-phase flow of gas and liquid into a gas dominated flow and a liquid dominated flow, the separator comprising:
a housing enclosing a separation chamber;
an inlet port for feeding the multi-phase flow into the separation chamber;
a liquid outlet port for discharging the liquid dominated flow from the separation chamber; and
a gas outlet port provided at a position above both the inlet port and the liquid outlet port for discharging the gas dominated flow from the separation chamber,
wherein both the inlet port and the liquid outlet port are positioned adjacent to an elongated lower bottom wall of the housing and define a flow direction into and out of the separation chamber approximately aligned along the bottom wall, and wherein the separation chamber extends above the bottom wall in between the inlet port and the liquid outlet port,
wherein a gas relief pipe which extends upwardly from an upper position of a multi-phase flow feeding pipe connected to the inlet port is connected to a gas inlet port provided at the housing in an upper position of the separation chamber.

29. A gas-liquid separator for separating a variable multi-phase flow of gas and liquid into a gas dominated flow and a liquid dominated flow, the separator comprising:
a housing enclosing a separation chamber;
an inlet port for feeding the multi-phase flow into the separation chamber;
a liquid outlet port for discharging the liquid dominated flow from the separation chamber; and
a gas outlet port provided at a position above both the inlet port and the liquid outlet port for discharging the gas dominated flow from the separation chamber,
wherein both the inlet port and the liquid outlet port are positioned adjacent to an elongated lower bottom wall of the housing and define a flow direction into and out of the separation chamber approximately aligned along the bottom wall, and wherein the separation chamber extends above the bottom wall in between the inlet port and the liquid outlet port,
wherein the bottom wall has an approximately semicircular cross-section, the radius of which is equal to the radius of a circular cross-section of the inlet port or the liquid outlet port, and
wherein the bottom wall comprises at least one elongated guide rail which extends along the bottom wall to guide a pig moving along the bottom wall.

* * * * *